US012666076B2

(12) United States Patent
Andrivon et al.

(10) Patent No.: US 12,666,076 B2
(45) Date of Patent: Jun. 23, 2026

(54) METHOD AND DEVICE OF INTRA PREDICTING CHROMA BLOCK OF VIDEO PICTURE, AND STORAGE MEDIUM

(71) Applicant: BEIJING XIAOMI MOBILE SOFTWARE CO., LTD., Beijing (CN)

(72) Inventors: Pierre Andrivon, Beijing (CN); Fabrice Leléannec, Beijing (CN); Miloš Radosavljević, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 0 days.

(21) Appl. No.: 18/879,182

(22) PCT Filed: Apr. 24, 2023

(86) PCT No.: PCT/CN2023/090440
§ 371 (c)(1),
(2) Date: Dec. 26, 2024

(87) PCT Pub. No.: WO2024/001472
PCT Pub. Date: Jan. 4, 2024

(65) Prior Publication Data
US 2025/0386049 A1     Dec. 18, 2025

(30) Foreign Application Priority Data

Jun. 29, 2022     (EP) ..................................... 22305945

(51) Int. Cl.
H04N 19/593 (2014.01)
H04N 19/11 (2014.01)
(Continued)

(52) U.S. Cl.
CPC ........... H04N 19/593 (2014.11); H04N 19/11 (2014.11); H04N 19/176 (2014.11); H04N 19/184 (2014.11); H04N 19/186 (2014.11)

(58) Field of Classification Search
CPC .... H04N 19/593; H04N 19/11; H04N 19/176; H04N 19/184; H04N 19/186; H04N 19/157
(Continued)

(56) References Cited

U.S. PATENT DOCUMENTS

| | | | |
|---|---|---|---|
| 2005/0053143 A1* | 3/2005 | Holcomb ............. | H04N 19/102 375/240.18 |
| 2015/0124875 A1* | 5/2015 | Xu ........................ | H04N 19/573 375/240.12 |

(Continued)

OTHER PUBLICATIONS

Alibaba Group "Non-EE2: On chroma intra prediction mode" Joint Video Experts Team of ITU-T SG 16 WP 3 and ISO/IEC JTC 1/SC 29, JVET-Y0092, Jan. 5, 2022, 4 pages.

(Continued)

*Primary Examiner* — Asmamaw G Tarko
(74) *Attorney, Agent, or Firm* — Cozen O'Connor

(57) ABSTRACT

A method of intra predicting a chroma block of a video picture includes: deriving a first predictor of the chroma block based on a first non-linear-model based mode; in response to deriving a chroma predictor based on a linear-model based mode being disabled, deriving a second predictor of the chroma block based on a second non-linear-model based mod; and determining a final predictor of the chroma block is determined by blending the first and second predictors.

18 Claims, 8 Drawing Sheets

(51) Int. Cl.
    *H04N 19/157*       (2014.01)
    *H04N 19/176*       (2014.01)
    *H04N 19/184*       (2014.01)
    *H04N 19/186*       (2014.01)

(58) Field of Classification Search
    USPC ...................................................... 375/240.12
    See application file for complete search history.

(56) References Cited

U.S. PATENT DOCUMENTS

| | | | |
|---|---|---|---|
| 2020/0154100 A1* | 5/2020 | Zhao | H04N 19/105 |
| 2020/0154118 A1* | 5/2020 | Yang | H04N 19/176 |
| 2021/0084318 A1* | 3/2021 | Kuo | H04N 19/91 |
| 2021/0112263 A1* | 4/2021 | Choi | H04N 19/176 |

OTHER PUBLICATIONS

European Patent Application No. 22305945.2 Search report and opinion dated Jan. 3, 2023, 11 pages.
PCT/CN2023/090440, International Search Report dated Aug. 4, 2023, 5 pages.

\* cited by examiner

SBTV    SBTH    STTV    STTH

METHOD AND DEVICE OF INTRA PREDICTING CHROMA BLOCK OF VIDEO PICTURE, AND STORAGE MEDIUM

CROSS-REFERENCE TO RELATED APPLICATION

This application is the US national phase application of International Application No. PCT/CN2023/090440, filed on Apr. 24, 2023, which claims the benefit of priority to European Patent Application No. 22305945.2, filed on Jun. 29, 2022, both of which are incorporated herein by reference in their entireties.

FIELD

The present disclosure generally relates to video picture encoding and decoding. Particularly, but not exclusively, the technical field of the present disclosure is related to a method and a device of intra predicting a chroma block of a video picture, and a storage medium.

BACKGROUND

Intra prediction is a part of encoding and decoding processes of videos. The intra prediction can be performed through a linear model (LM) mode, which predicts chroma signals from luma signals using a linear model based on nearby reconstructed samples, so as to improve coding efficiency by leveraging the correlation between luma and chroma components in video data.

In a case that LM mode is disabled at the encoder/decoder (by profiling or due to bitstream constraints for instance), chroma fusion cannot be applied or should be disabled. This may arise in case of applications requiring very low latency/delay in which cross-component tools may be disabled or applications with low power requirements where chroma saving is not of uttermost importance.

SUMMARY

According to a first aspect of the present disclosure, there is provided a method of intra predicting a chroma block of a video picture, in which the method comprises deriving a first predictor of the chroma block based on a first non-linear-model based mode; if deriving a chroma predictor based on a linear-model based mode is disabled, deriving a second predictor of the chroma block based on a second non-linear-model based mode; determining a final predictor of the chroma block by blending the first and second predictors.

According to a second aspect of the present disclosure, there is provided a non-transitory computer-readable storage medium carrying instructions that, when being executed by a processor of an electronic device, cause the device to perform a method of intra predicting a chroma block of a video picture. The method includes: deriving a first predictor of the chroma block based on a first non-linear-model based mode; if deriving a chroma predictor based on a linear-model based mode is disabled, deriving a second predictor of the chroma block based on a second non-linear-model based mode; determining a final predictor of the chroma block by blending the first and second predictors.

According to a third aspect of the present disclosure, there is provided an electronic device for intra predicting a chroma block of a video picture. The device includes a processor, and a memory for storing instructions executable by the processor. The processor is configured to: derive a first predictor of the chroma block based on a first non-linear-model based mode; if deriving a chroma predictor based on a linear-model based mode is disabled, derive a second predictor of the chroma block based on a second non-linear-model based mode; determine a final predictor of the chroma block by blending the first and second predictors.

The specific nature of at least one of the embodiments as well as other objects, advantages, features and uses of said at least one of embodiments will become evident from the following description of examples taken in conjunction with the accompanying drawings.

BRIEF DESCRIPTION OF THE DRAWINGS

Reference will now be made, by way of example, to the accompanying drawings which show embodiments of the present disclosure.

Similar or same elements are referenced with the same reference numbers.

DETAILED DESCRIPTION OF EMBODIMENTS

Figure 1:
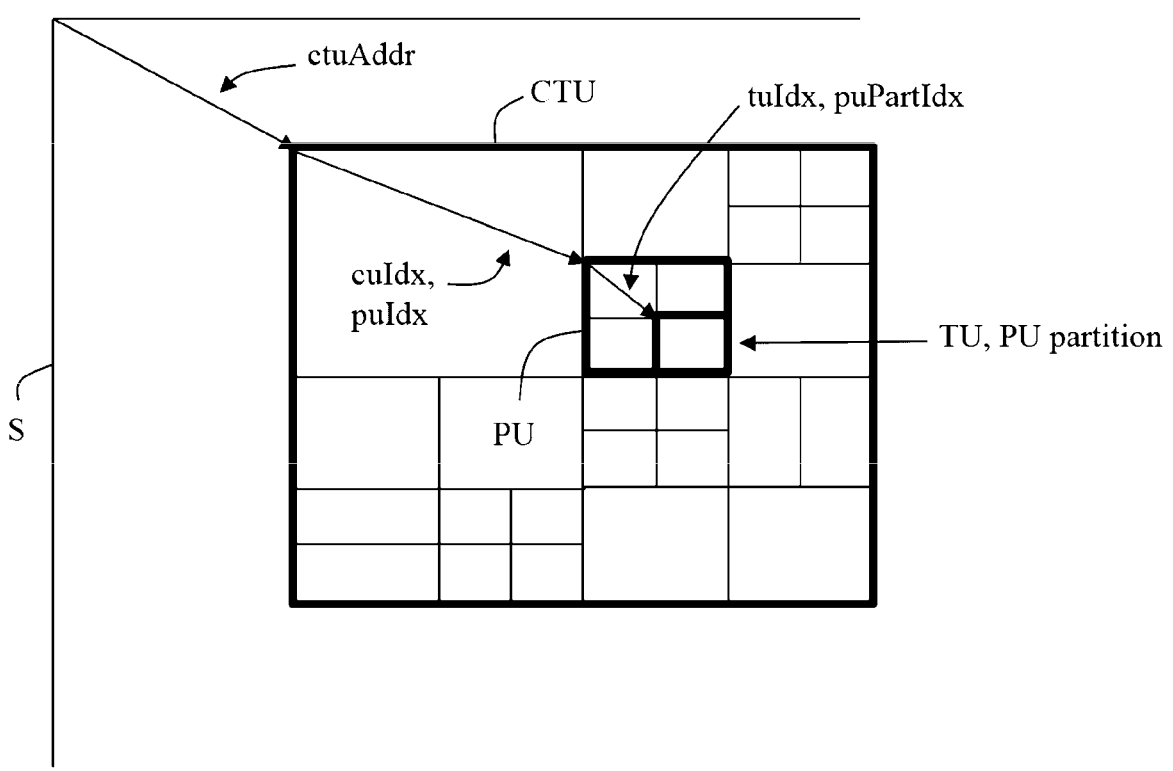
FIG. 1 shows an example of coding-tree unit in accordance with HEVC.

At least one of the embodiments is described more fully hereinafter with reference to the accompanying figures, in which examples of at least one of the embodiments are depicted. An embodiment may, however, be embodied in many alternate forms and should not be construed as limited to the examples set forth herein. Accordingly, it should be understood that there is no intent to limit embodiments to the particular forms disclosed. On the contrary, the present disclosure is intended to cover all modifications, equivalents, and alternatives falling within the spirit and scope of the present disclosure.

The present section is intended to introduce the reader to various aspects of art, which may be related to various aspects of at least one embodiment of the present disclosure that is described and/or claimed below. This discussion is believed to be helpful in providing the reader with background information to facilitate a better understanding of the various aspects of the present disclosure. Accordingly, it should be understood that these statements are to be read in this light, and not as admissions of the prior art.

A pixel corresponds to the smallest display unit on a screen, which can be composed of one or more sources of light (1 for monochrome screen or 3 or more for colour screens).

A video picture, also denoted frame or picture frame, comprises at least one component (also called picture component, or channel) determined by a specific picture/video format which specifies all information relative to pixel values and all information which may be used by a display unit and/or any other device to display and/or to decode video picture data related to said video picture.

A video picture comprises at least one component usually expressed in the shape of an array of samples.

A monochrome video picture comprises a single component and a color video picture may comprise three components.

For example, a color video picture may comprise a luma (or luminance) component and two chroma components when the picture/video format is the well-known (Y, Cb, Cr) format or may comprise three color components (one for Red, one for Green and one for Blue) when the picture/video format is the well-known (R, G, B) format.

Each component of a video picture may comprise a number of samples relative to a number of pixels of a screen on which the video picture is intended to be displayed. In variants, the number of samples comprised in a component may be a multiple (or fraction) of a number of samples comprised in another component of a same video picture.

For example, in the case of a video format comprising a luma component and two chroma components like the (Y, Cb, Cr) format, dependent on the color format considered, the chroma component may contain half the number of samples in width and/or height, relative to the luma component.

A sample is the smallest visual information unit of a component composing a video picture. A sample value may be, for example, a luma or chroma value or a colour value of a (R, G, B) format.

A pixel value is the value of a pixel of a screen. A pixel value may be represented by one sample for a monochrome video picture and by multiple co-located samples for a color video picture. Co-located samples associated with a pixel mean samples corresponding to the location of a pixel in the screen.

It is common to consider a video picture as being a set of pixel values, each pixel being represented by at least one sample.

A block of a video picture is a set of samples of one component of the video picture. A block of at least one luma sample, in short a luma block, or a block of at least one chroma sample, in short a chroma block, may be considered when the picture/video format is the well-known (Y, Cb, Cr) format, or a block of at least one color sample when the picture/video format is the well-known (R, G, B) format.

The at least one embodiment is not limited to a particular picture/video format.

In the state-of-the-art video compression systems such as HEVC (ISO/IEC 23008-2 High Efficiency Video Coding, ITU-T Recommendation H.265, https://www.itu.int/rec/T-REC-H.265-202108-P/en) or VVC (ISO/IEC 23090-3 Versatile Video Coding, ITU-T Recommendation H.266, https://www.itu.int/rec/T-REC-H.266-202008-I/en, low-level and high-level picture partitioning are provided to divide a video picture into picture areas so-called Coding- Tree Units (CTU) which size may be typically between 16×16 and 64×64 pixels for HEVC and 32×32, 64×64, or 128×128 pixels for VVC.

The CTU division of a video picture forms a grid of fixed size CTUs, namely a CTU grid, in which upper and left boundaries spatially coincide with the top and left borders of the video picture. The CTU grid represents a spatial partition of the video picture.

In VVC and HEVC, the CTU size (CTU width and CTU height) of all the CTUs of a CTU grid equals a same default CTU size (default CTU width CTU DW and default CTU height CTU DH). For example, the default CTU size (default CTU height, default CTU width) may equal to 128 (CTU DW=CTU DH=128). A default CTU size (height, width) is encoded into the bitstream, for example at a sequence level in the Sequence Parameter Set (SPS).

The spatial position of a CTU in a CTU grid is determined from a CTU address ctuAddr defining a spatial position of the top-left corner of a CTU from an origin. As illustrated on FIG. 1, the CTU address may define the spatial position from the top-left corner of a higher-level spatial structure S containing the CTU.

A coding tree is associated with each CTU to determine a tree-division of the CTU.

As illustrated on FIG. 1, in HEVC, the coding tree is a quad-tree division of a CTU, where each leaf is called a Coding Unit (CU). The spatial position of a CU in the video picture is defined by a CU index cuIdx indicating a spatial position from the top-left corner of the CTU. A CU is spatially partitioned into one or more Prediction Units (PU). The spatial position of a PU in the video picture VP is defined by a PU index puIdx defining a spatial position from the top-left corner of the CTU and the spatial position of an element of a partitioned PU is defined by a PU partition index puPartIdx defining a spatial position from the top-left corner of a PU. Each PU is assigned some intra or inter prediction data.

The coding mode intra or inter is assigned on the CU level. That means that a same intra/inter coding mode is assigned to each PU of a CU, though the prediction parameters varying from PU to PU.

A CU may be also spatially partitioned into one or more Transform Units (TU), according to a quad-tree called the transform tree. Transform Units are the leaves of the transform tree. The spatial position of a TU in the video picture is defined by a TU index tuIdx defining a spatial position from the top-left corner of a CU. Each TU is assigned some transform parameters. The transform type is assigned on the TU level, and 2D separate transform is performed at TU level during the coding or decoding of a picture block.

Figure 2:
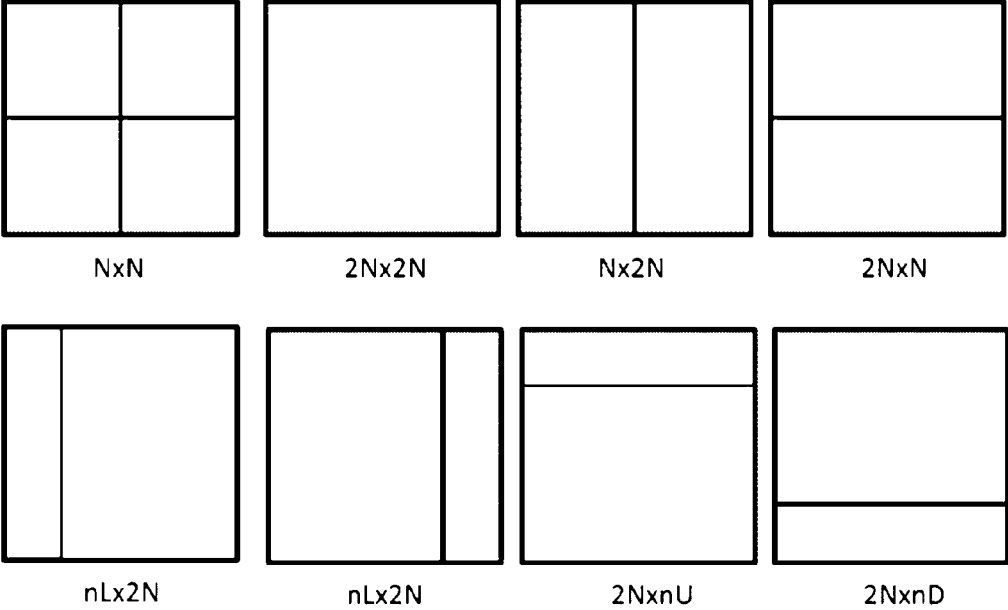
FIG. 2 shows an example of partitioning coding units into prediction units in accordance with HEVC.

The PU Partition types existing in HEVC are illustrated on FIG. 2. They include square partitions (2N×2N and N×N), which are the only ones used in both Intra and Inter prediction CUs, symmetric non-square partitions (2N×N, N×2N, used only in Inter prediction CUs), and asymmetric Partitions (used only in Inter prediction CUs). For instance, the PU type 2N×nU stands for an asymmetric horizontal partitioning of the PU, where the smaller partition lies on the top of the PU. According to another example, PU type 2N×nL stands for an asymmetric horizontal partitioning of the PU, where the smaller partition lies on the top of the PU.

Figures 3, 4:
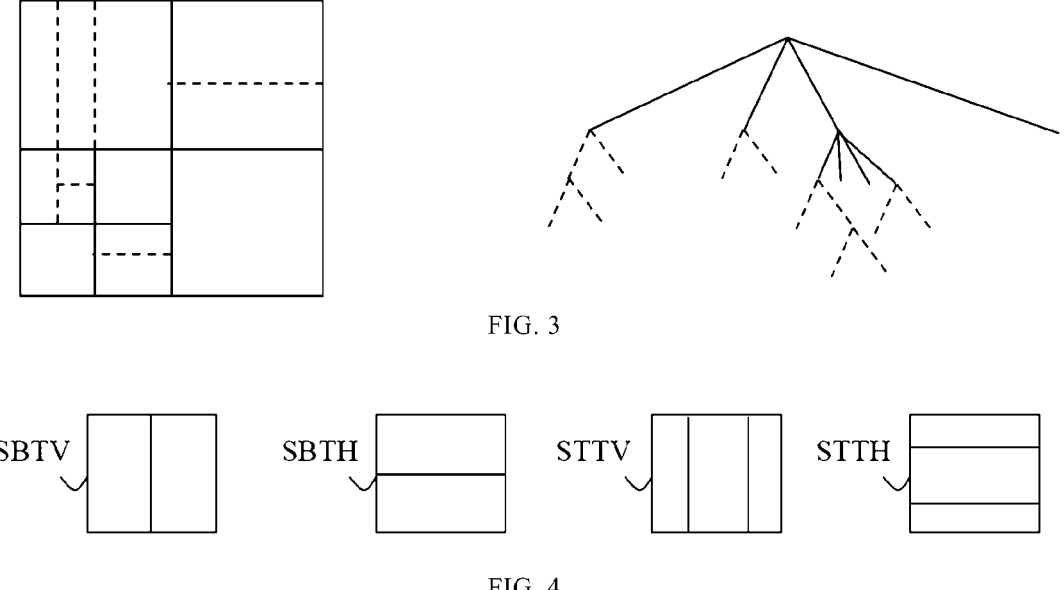
FIG. 3 shows an example of a CTU division in accordance with VVC.
FIG. 4 shows examples of split modes supported in the multi-type tree partitioning in accordance with VVC.

As illustrated on FIG. 3, in VVC, the coding tree starts from a root node, i.e. the CTU. Next, a quad-tree (or quaternary tree) split divides the root node into 4 nodes corresponding to 4 sub-blocks of equal sizes (solid lines). Next, the quaternary tree (or quad-tree) leaves can then be further partitioned by a so-called multi-type tree, which involves a binary or ternary split according to one of 4 split modes illustrated on FIG. 4. These split types are the vertical and horizontal binary split modes, noted SBTV and SBTH and the vertical and horizontal ternary split modes SPTTV and STTH.

The leaves of the coding tree of a CTU are CU in the case of a joint coding tree shared by luma and chroma components.

Contrary to HEVC, in VVC, in most cases, CU, PU and TU have equal size, which means coding units are generally not partitioned into PU or TU, except in some specific coding modes.

Figure 5:
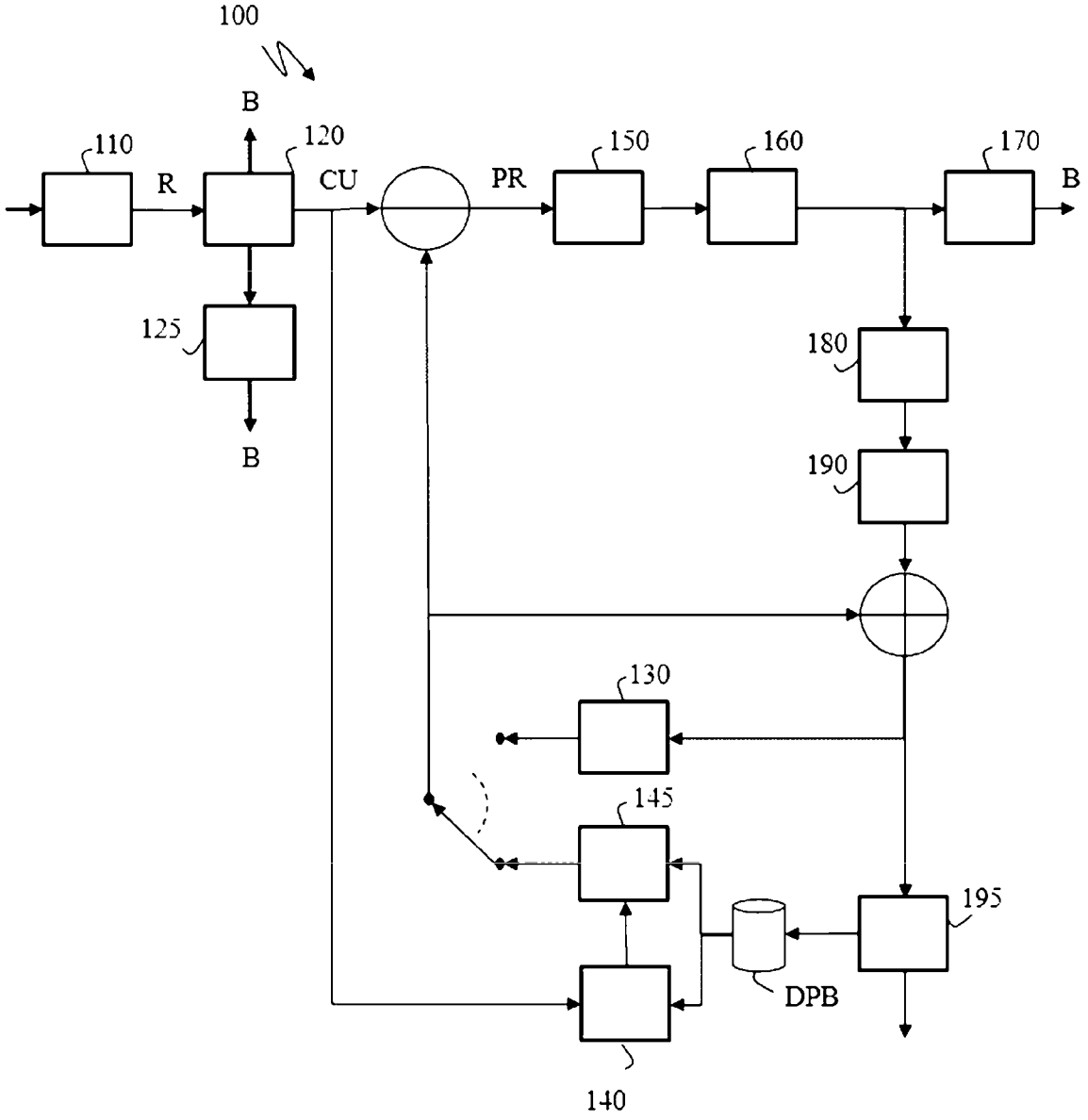
FIG. 5 shows a schematic block diagram of steps of a method 100 of encoding a video picture VP in accordance with prior art.
Figure 6:
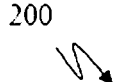
FIG. 6 shows a schematic block diagram of steps of a method 200 of decoding a video picture VP in accordance with prior art.
Figure 6:
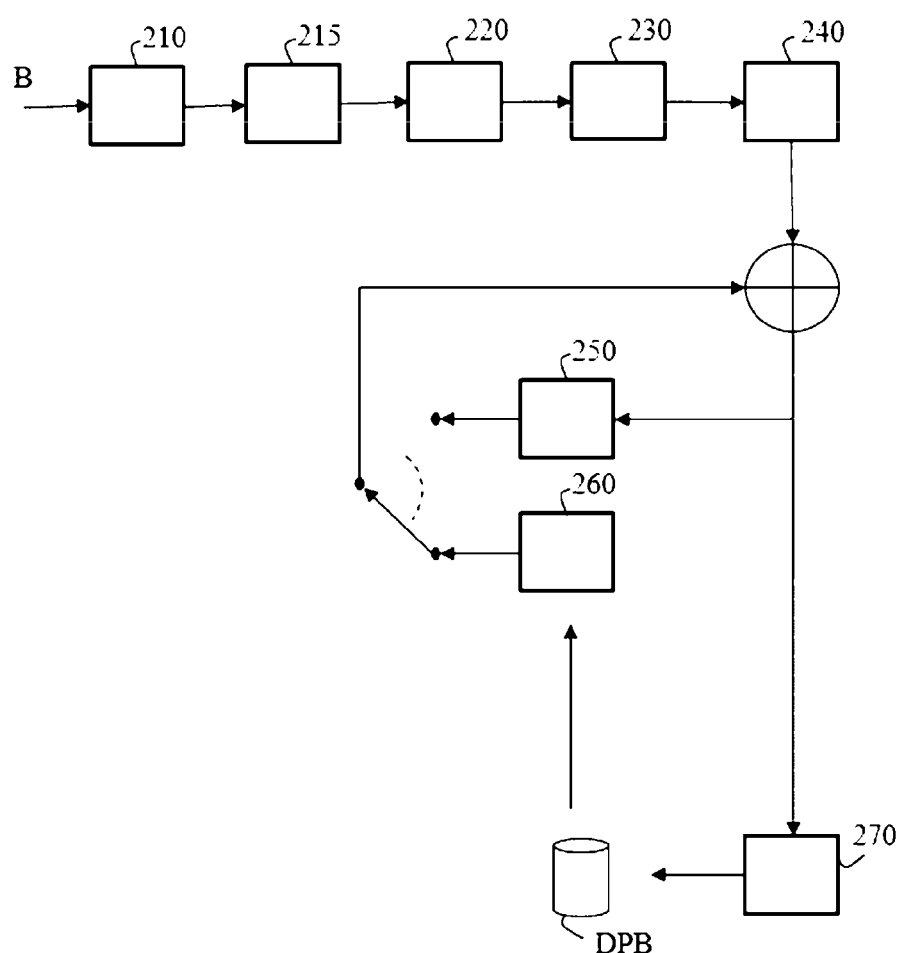

FIGS. 5 and 6 provide an overview of video encoding/decoding methods used in current video standard compression systems like HEVC or VVC for example.

FIG. 5 shows a schematic block diagram of steps of a method 100 of encoding a video picture VP in accordance with the prior art.

In step 110, a video picture VP is partitioned into blocks of samples and partitioning information data is signaled into a bitstream. Each block comprises samples of one component of the video picture VP. The blocks thus comprise samples of each component defining the video picture VP.

For example, in HEVC, a picture is divided into Coding Tree Units (CTU). Each CTU may be further subdivided using a quad-tree division, where each leaf of the quad-tree is denoted a Coding Unit (CU). The partitioning information data may then comprise data describing the CTU and the quad-tree subdivision of each CTU.

Each block of samples, in short block, may then be either a CU (if the CU comprises a single PU) or a PU of a CU.

Each block is encoded along an encoding loop also called "in loop" using either an intra or inter prediction mode.

Intra prediction (step 120) used intra prediction data. Intra prediction consists in predicting a current block by means of an intra-prediction block based on already encoded, decoded and reconstructed samples located around the current block, typically on the top and on the left of the current block. Intra prediction is performed in the spatial domain.

In inter-prediction mode, motion estimation (step 130) and motion compensation (135) are performed. Motion estimation searches, in one or more reference picture(s) used to predictively encode the current video picture, a reference block that is a good predictor of the current block. In uni-directional motion estimation/compensation, a candidate reference block belongs to a single reference picture of a reference picture list denoted L0 or L1, and in bi-directional motion estimation/compensation, the candidate reference block is derived from a reference block of the reference picture list L0 and a reference block of the reference picture list L1.

For instance, a good predictor of the current block is a candidate reference block which is similar to the current block. It may also correspond to a reference block that provides a good trade-off between its similarity to current block, and the rate cost of motion information needed to indicate its use for the temporal prediction of current block.

The output of the motion estimation step 130 is inter-prediction data comprising motion information associated to the current block and other information used for obtaining a same prediction block at the encoding/decoding side. Typically motion information comprises one motion vector and a reference picture index for uni-directional estimation/compensation and two motion vectors and two reference picture indices for bi-direction estimation/compensation). Next, motion compensation (step 135) obtains a prediction block by means of the motion vector(s) and reference picture index (indices) determined by the motion estimation step 130. Basically, the reference block belonging to a selected reference picture and pointed to by a motion vector may be used as the prediction block of the current block. Furthermore, since motion vectors are expressed in fractions of integer pixel positions (which is known as sub-pel accuracy motion vector representation), motion compensation generally involves a spatial interpolation of some reconstructed samples of the reference picture to compute the prediction block.

Prediction information data is signaled into the bitstream. The prediction information may comprise prediction mode (intra or inter or skip), intra/inter prediction data and any other information used for obtaining a same prediction block at the decoding side.

The method 100 selects one prediction mode (the intra or inter prediction mode) by optimizing a rate-distortion trade-off taking into account the encoding of a prediction residual block calculated, for example, by subtracting a candidate prediction block from the current block, and the signaling of prediction information data required for determining said candidate prediction block at the decoding side.

Usually, the best prediction mode is given as being the prediction mode of a best coding mode p* for a current block given by:

$$p^* = \underset{p \in P}{\text{Arg min}} \{RD_{cost}(p)\}$$

where P is the set of all candidate coding modes for the current block, p represents a candidate coding mode in that set, $RD_{cost}(p)$ is a rate-distortion cost of candidate coding mode p, typically expressed as:

$$RD_{cost(p)} = D(p) + \lambda.R(p)$$

D(p) is the distortion between the current block and a reconstructed block obtained after encoding/decoding the current block with the candidate coding mode p, R(p) is a rate cost associated with the coding of the current block with coding mode p, and $\lambda$ is the Lagrange parameter representing the rate constraint for coding the current block and typically computed from a quantization parameter used for encoding the current block.

The current block is usually encoded from a prediction residual block PR. More precisely, a prediction residual block PR is calculated, for example, by subtracting the best prediction block from the current block. The prediction residual block PR is then transformed (step 140) by using, for example, a DCT (discrete cosine transform) or DST (Discrete Sinus transform) type transform, or any other appropriate transform, and the obtained transformed coefficient block is quantized (step 150).

In variant, the method 100 may also skip the transform step 140 and apply quantization (step 150) directly to the prediction residual block PR, according to the so-called transform-skip coding mode.

Quantized transform coefficient block (or quantized prediction residual block) is entropy encoded into the bitstream (step 160).

Next, the quantized transform coefficient block (or the quantized residual block) is de-quantized (step 170) and inverse transformed (180) (or not) as part of the encoding loop, leading to a decoded prediction residual block. The decoded prediction residual block and the prediction block are then combined, typically summed, which provides the reconstructed block.

Other information data may also be entropy encoded in step 160 for encoding a current block of the video picture VP.

In-loop filters (step 190) may be applied to a reconstructed picture (comprising reconstructed blocks) to reduce compression artefacts. Loop filters may apply after all picture blocks are reconstructed. For instance, they consist in deblocking filter, Sample Adaptive Offset (SAO) or adaptive loop filter.

The reconstructed blocks or the filtered reconstructed blocks form a reference picture that may be stored into a decoded picture buffer (DPB) so that it can be used as a reference picture for the encoding of a next current block of the video picture VP, or of a next vide picture to encode.

FIG. 6 shows a schematic block diagram of steps of a method 200 of decoding a video picture VP in accordance with the prior art.

In step 210, partitioning information data, prediction information data and quantized transform coefficient block (or quantized residual block) are obtained by entropy decoding a bitstream of encoded video picture data. For instance, this bitstream has been generated in accordance with the method 100.

Other information data may also be entropy decoded for decoding from the bitstream a current block of the video picture VP.

In step 220, a reconstructed picture is divided into current blocks based on the partitioning information. Each current block is entropy decoded from the bitstream along a decoding loop also called "in loop". Each decoded current block is either a quantized transform coefficient block or a quantized prediction residual block.

In step 230, the current block is de-quantized and possibly inverse transformed (step 240), to obtain a decoded prediction residual block.

On the other hand, the prediction information data is used to predict the current block. A prediction block is obtained through its intra prediction (step 250) or its motion-compensated temporal prediction (step 260). The prediction process performed at the decoding side is identical to that of the encoding side.

Next, the decoded prediction residual block and the prediction block are then combined, typically summed, which provides a reconstructed block.

In step 270, in-loop filters may apply to a reconstructed picture (comprising reconstructed blocks) and the reconstructed blocks or the filtered reconstructed blocks form a reference picture that may be stored into a decoded picture buffer (DPB) as above discussed (FIG. 5).

In VVC, motion information is stored per 4×4 blocks in each video picture. This means once a reference picture is stored in the decoded picture buffer (DPB, FIG. 5 or 6), motion vectors and reference pictures indices used for the temporal prediction of video picture blocks are stored on a 4×4 block basis. They can serve as temporal prediction of motion information for encoding/decoding a subsequent inter-prediction video picture.

To reduce cross-component redundancy, VVC defines so-called Linear-Model based intra prediction mode (LM modes).

One of them is a so-called Cross-Component Linear Model (CCLM) that derives a linear-model based predictor, in short LM predictor, comprising predicted chroma samples $pred_C(i, j)$ based on co-located reconstructed luma samples $$rec'_L(i, j)$$

or a same Cu by using a linear model:

$$pred_C(i, j) = \alpha \cdot rec'_L(i, j) + \beta$$

where $\alpha$ and $\beta$ are linear parameters of the linear model which are derived from reference samples, i.e. reconstructed chroma and luma samples.

The reconstructed luma samples $$rec'_L(i, j)$$

are down-sampled after filtering to match the CU chroma size.

In VVC, three CCLM modes, denoted CCLM_LT, CCLM_T and CCLM_L are specified. These three CCLM modes differ with respect to the location of the reference samples that are used for linear parameters derivation. Reference samples from the top boundary are involved in the CCLM_T mode and the reference samples from the left boundary are involved in the CCLM_L mode. In the CCLM_LT mode, reference samples of both the top boundary and the left boundary are used.

Overall, the prediction process of CCLM modes consists of three steps: 1) Down-sampling of the luma block and its neighboring reconstructed luma samples $$rec'_L(i, j)$$

to match the size of corresponding chroma block, 2) linear parameters derivation based on the neighboring reconstructed luma samples, 3) Application of equation (10) to generate the chroma intra prediction samples (predicted chroma block).

Another LM modes is the so-called Multi-Model Linear Model (MMLM, [K. Zhan et al, "Enhanced Cross-component Linear Model Intra Prediction", JVET-D0110, San Diego, October 2016]). MMLM is an extension of CCLM because more than one linear model is derived from co-located reconstructed luma samples $$rec'_L(i, j).$$

In MMLM, neighboring reconstructed luma samples and neighboring chroma samples are classified into several groups, each group is used as a training set to derive linear parameters of a linear model (i.e., particular $\alpha$ and $\beta$ are derived for a particular group). Furthermore, the samples of a current luma block are also classified based on the same rule for the classification of neighboring luma samples. The neighboring samples are, for example, classified into M groups. The MMLM method with M=2 and M=3 are designed as two appended LM modes for chroma named MMLM2 and MMLM3, besides the original LM mode (CCLM). The encoder chooses the optimal LM mode in a Rate/Distortion Optimization process and signals the best LM mode. For example, when M is equal to 2, a threshold is calculated as the average value of the neighboring reconstructed luma samples. A neighboring reconstructed sample $rec'_L[x,y]$ lower than or equal to the threshold is classified into group 1; while a neighboring reconstructed sample $rec'_L[x,y]$ greater than the threshold is classified into group 2.

The two LM predictors are then derived as:

$$\begin{cases} Pred_C[x, y] = \alpha_1 \times rec'_L[x, y] + \beta_1 & \text{if } rec'_L[x, y] \leq \text{Threshold} \\ Pred_C[x, y] = \alpha_2 \times rec'_L[x, y] + \beta_2 & \text{if } rec'_L[x, y] > \text{Threshold} \end{cases}$$

MMLM is included in the Enhanced Compression Model (ECM) (M. Coban et al, "Algorithm description of Enhanced Compression Model 4 (ECM 4)", JVET-Y2025, Online, July 2021) exploring improvement of compression performance beyond VVC, where the neighbouring reconstructed samples are classified into two classes using a threshold which is the average of the luma neighboring reconstructed samples. The linear model of each class is derived using the Least Mean Square (LMS) method.

VVC further defines a Decoder-side Intra Mode Derivation (DIMD) mode for both luma and chroma samples. DIMD mode is not a linear-model based mode, in short non-LM mode, i.e. an intra prediction mode that does not refer to a linear model and which does not require explicit intra prediction mode signaling such as, for instance planar prediction mode, or Direct mode (DM).

For luma sample prediction, the use of DIMD luma mode is signalled in a bitstream by a single flag and the intra predictor is not explicitly signalled in the bitstream but derived by using a gradient analysis of neighbouring reconstructed luma samples i.e. DIMD luma mode is implicit. Thus, intra predictor is derived from a DIMD luma mode during reconstruction process identically at the encoder and decoder sides.

Figure 7:
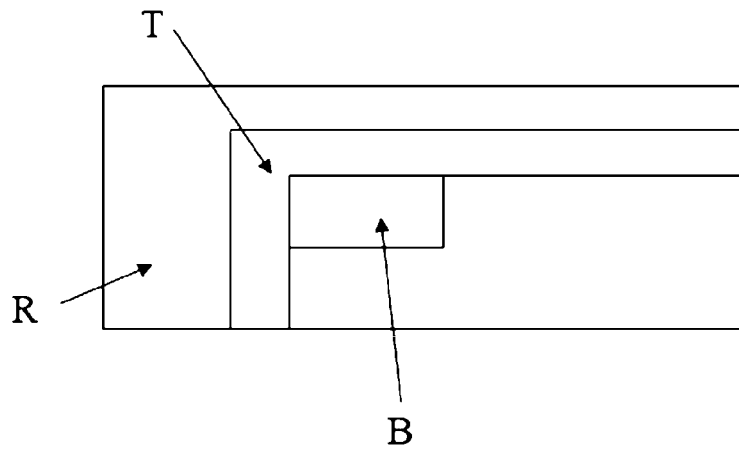
FIG. 7 shows schematically a method to derive a chroma block predictor from a DIMD mode in accordance with prior art.
Figure 7:
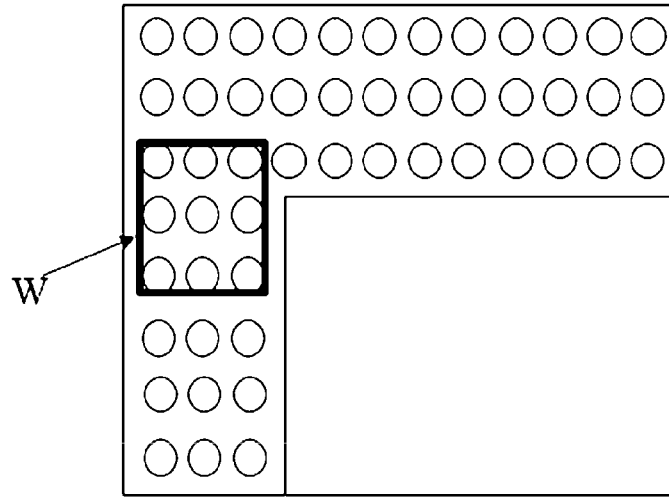
Figure 7:
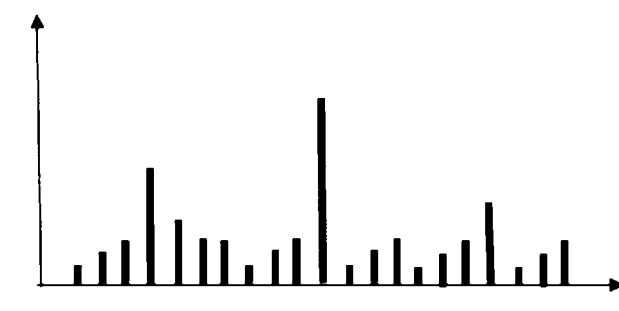

In DIMD luma mode, as illustrated on FIG. 7, a 3-samples wide (in width or height) template area T (composed of left, above and above-left reconstructed luma samples of reconstructed area R) is defined in which edge detection filters (3×3 horizontal and vertical Sobel filters), adjacent to a current block B (current CU), are applied in order to determine the amplitude and angle of luminance directions (orientation) for each middle line sample of the (available) template area T. A Histogram of Gradients (HoG) is computed where each entry corresponds to conventional intra angular modes and cumulated intensities (amplitudes) are stored:

$$\text{angle} = \arctan\left(G_{hor}/G_{ver}\right)$$

$$\text{amplitude} = |G_{hor}| + |G_{hor}|$$

with Ghor and Gver are the intensity of pure horizontal and vertical directions as calculated by Sobel filters.

In DIMD luma mode, a luma blending (mixing, fusing) is applied as a weighted average of three luma predictors: two HoG-based predictors and a planar predictor (M. Abdoli et al, "Non-CE3: Decoder-side Intra Mode Derivation with Prediction Fusion Using Planar", JVET-O0449, Gothenburg, July 2019).

A planar predictor is derived from a planar mode in which the predicted sample values are obtained as a weighted average of 4 reference sample values. Here, the reference samples in the same row or column as the current sample and the reference samples on the bottom-left and on the top-right position with respect to the current block are used. In VVC, a reference sample smoothing filter is also applied for the Planar mode in the luma component depending on the block size.

Figure 8:
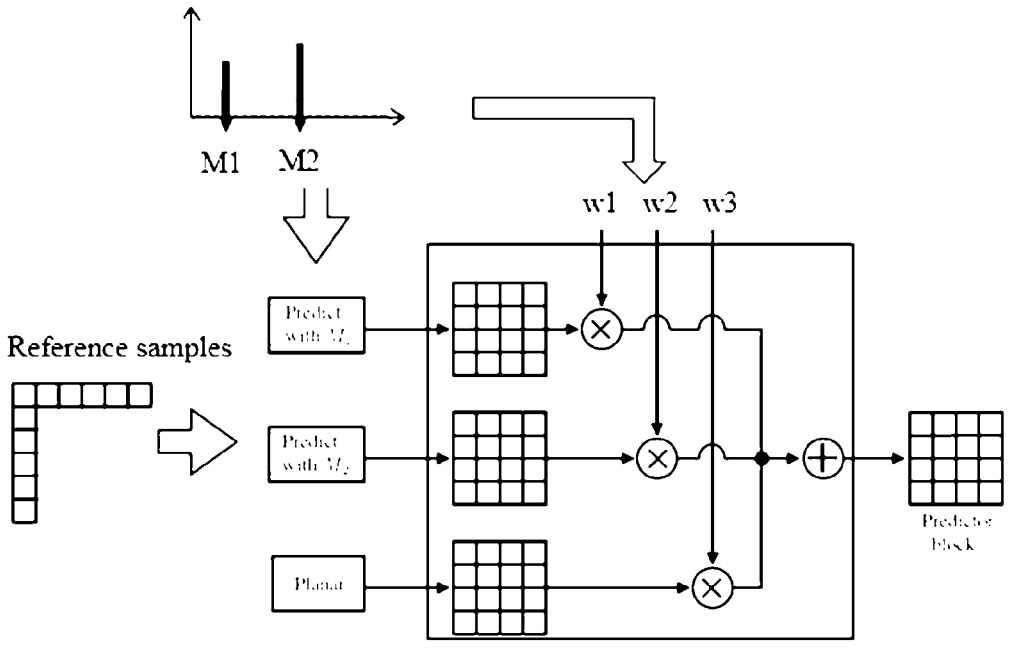
FIG. 8 shows schematically a method of blending multiple chroma predictors in accordance with prior art.

As illustrated on FIG. 8, the two most represented angular intra modes M1 and M2 (having the largest histogram amplitude values) are selected from the HoG and are combined (fused) with a planar mode with weights $w_1$, $w_2$, $w_3$ derived from the selected angular intra prediction amplitudes' ratio (with planar having a ratio of 1/3 i.e. 21/64 with 6 bits integer precision).

For chroma sample prediction, the use of DIMD chroma mode is signalled in a bitstream by a single flag and the intra predictor is not explicitly signalled in the bitstream but derived by using a gradient analysis of neighbouring reconstructed luma and chroma samples i.e. DIMD chroma mode is implicit. Thus, intra predictor is derived from a DIMD chroma mode during reconstruction process identically at the encoder and decoder sides.

Figure 9:
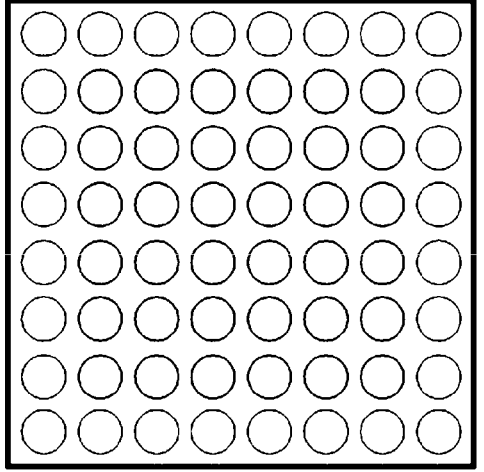
FIG. 9 shows schematically examples of co-located luma samples of a chroma block in accordance with prior art.
Figure 9:
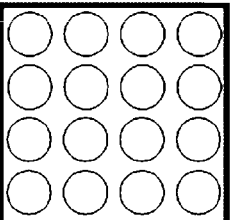

In DIMD chroma mode, an intra predictor of a chroma block may be derived based on co-located reconstructed luma samples of a luma block associated with the chroma block to be predicted. Specifically, a horizontal gradient and a vertical gradient are calculated for each co-located reconstructed luma sample (grey circles on FIG. 9, extracted from JVET-Y0092) to build a HoG. Then, the intra prediction mode with the largest histogram amplitude value is selected from the HoG.

In variant, in DIMD chroma mode, an intra predictor of a chroma block may be derived based on neighboring reconstructed chroma samples.

In a variant, an intra predictor of a chroma block may be derived based on co-located reconstructed luma samples of a luma block associated with the chroma block to be predicted and on neighboring reconstructed chroma samples.

When the intra prediction mode derived from the DIMD chroma mode is the same as the intra prediction mode derived from the DM (direct mode) mode, the intra prediction mode with the second largest histogram amplitude value is selected as the DIMD chroma mode.

Direct Mode (DM) is a chroma intra prediction mode corresponding to the intra prediction mode of co-located reconstructed luma samples.

A non-linear-model based predictor, in short non-LM predictor, of the chroma block is then derived from a non-LM mode selected among a DM mode, five default modes and the DIMD chroma mode. Chroma predictors are derived from those non-LM modes and the selected non-LM mode corresponds to the non-LM predictor that minimizes a ratio/distortion trade-off.

The five default modes are DC, Planar, Direct Mode, horizontal and vertical angular predictions.

DC is an intra prediction mode that uses the mean sample value of the reference samples to the left and above the block for prediction generation.

Planar mode is a weighted average of 4 reference sample values (picked up as orthogonal projections of the sample to predict in the top and left reconstructed areas).

Horizontal and vertical modes use respectively copy of left and above reconstructed samples without interpolation to predict samples rows and columns, respectively.

The non-LM predictor of the chroma block derived from the selected non-LM mode is then fused (blended, mixed) with the LM predictor derived from the MMLM_LT mode as follows:

$$pred = (w0 * pred0 + w1 * pred1) >> shift$$

where pred0 is the predictor obtained by applying the non-LM mode, pred1 is the predictor obtained by applying the LM mode and pred is the final predictor of the chroma block. For I slices (Intra-codes slices), the two weights, w0 and w1 are determined by the intra prediction mode of adjacent chroma blocks and shift is set equal to 2. Specifically, when the above and left adjacent blocks are both coded with LM modes, {w0, w1}={1, 3}; when the above and left adjacent blocks are both coded with non-LM modes, {w0, w1}={3, 1}; otherwise, {w0, w1}={2, 2}. For non-I slices, w0 and w1 are both set equal to 2.

If a non-LM mode is selected, one flag is signaled to indicate whether the fusion is applied.

In a variant, for I slices, i.e., intra-coded slice, non-LM predictors derived from the DM mode, the four default modes and the DIMD chroma mode can be fused with a LM predictor derived from the LM mode, while for non-I slices, only the non-LM predictor derived from the DIMD chroma mode can be fused with the LM predictor derived from the LM mode using equal weights.

Chroma fusion mode can be used with DIMD chroma (if selected as best non-LM mode) but any other non-LM mode may be used instead.

In case LM mode is disabled at the encoder/decoder (by profiling or due to bitstream constraints for instance), chroma fusion cannot be applied reducing thus coding performance. This may arrive in case of applications requiring very low latency/delay in which cross-component tools may be disabled or applications with low power requirements where chroma saving is not of uttermost importance (e.g. video surveillance on embedded devices).

The problem solved by the present disclosure is to improve the coding efficiency of state-of-the-art video codecs. More particularly, the disclosure proposes, in a non-limitative way, to overcome the limitations discusses above.

At least one embodiment of the present disclosure has been devised with the foregoing in mind.

At least one of the aspects generally relates to video picture encoding and decoding, one other aspect generally relates to transmitting a bitstream provided or encoded and one of other aspects relates to receiving/accessing a decoded bitstream.

At least one of the embodiments is described for encoding/decoding a video picture but extends to the encoding/decoding of video pictures (sequences of pictures) because each video picture is sequentially encoded/decoded as described below.

Moreover, the at least one embodiments is not limited to MPEG standards such as AVC (ISO/IEC 14496-10 Advanced Video Coding for generic audio-visual services, ITU-T Recommendation H.264, https://www.itu.int/rec/T-REC-H.264-202108-P/en), EVC (ISO/IEC 23094-1 Essential video coding), HEVC (ISO/IEC 23008-2 High Efficiency Video Coding, ITU-T Recommendation H.265, https://www.itu.int/rec/T-REC-H.265-202108-P/en, VVC (ISO/IEC 23090-3 Versatile Video Coding, ITU-T Recommendation H.266, https://www.itu.int/rec/T-REC-H.266-202008-I/en but may be applied to other standards and recommendations such as AV1 (AOMedia Video 1, http://aomedia.org/av1/specification/) for example. The at least one embodiment may apply to pre-existing or future-developed, and extensions of any such standards and recommendations. Unless indicated otherwise, or technically precluded, the aspects described in the present disclosure may be used individually or in combination.

Generally speaking, the present disclosure relates to intra predicting a chroma block of a video picture into a bitstream of encoded video picture data. A first predictor of the chroma block is derived based on a first non-linear-model based mode. If deriving a chroma predictor based on a linear-model based mode is disabled, a second predictor of the chroma block is derived based on a second non-linear-model based mode and a final predictor of the chroma block is determined by blending the first and second predictors.

The present disclosure improves the chroma prediction as defined in VVC and thus the global coding performance because the chroma prediction may be based on blending multiple predictions even if the linear-model based mode is disabled or disactivated. It permits leveraging the usage of chroma blending (fusion) in any case.

Figure 10:
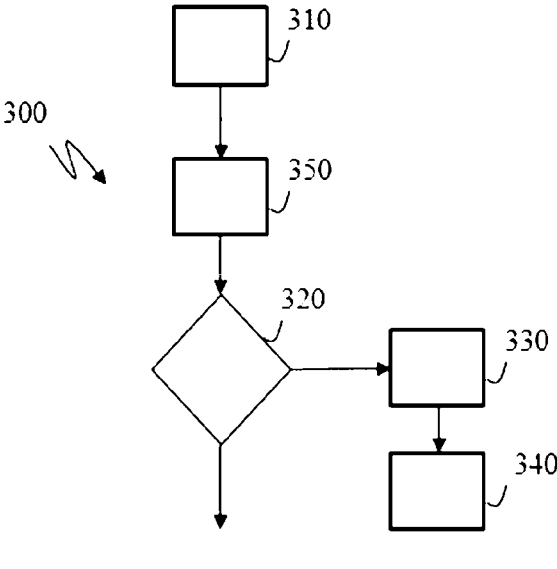
FIG. 10 shows schematically a block diagram of a method 300 of predicting a chroma block in accordance with an embodiment.

FIG. 10 shows schematically a block diagram of a method 300 of predicting a chroma block in accordance with an embodiment.

The method 300 applies both in the encoding method 100 and the decoding method 200 for predicting a chroma block associated with a current CU.

In step 310, a first predictor pred1 of the chroma block is derived based on a first non-LM mode.

In step 320, the method 300 checks whether deriving a chroma predictor based on a LM mode is disabled.

If deriving a chroma predictor based on a LM mode is enabled, a final chroma prediction of the chroma block is obtained as discussed above in the introducing part of the present disclosure.

If deriving a chroma predictor based on a LM mode is disabled, in step 330, a second predictor pred2 of the chroma block is derived based on a second non-LM mode and in step 340 a final predictor pred of the chroma block by blending the first and second predictors:

$$pred = (w1 * pred1 + w2 * pred2) >> shift$$

where shift may equal 2.

In one embodiment, in step 350, a data is signaled into a bitstream. The data indicates whether deriving a chroma predictor based on a LM mode is enabled.

Signaling the data into the bitstream means that the data is written in the bitstream during the method 100 and the data is read from the bitstream during the method 200.

In one embodiment, the first predictor is derived from a first non-linear-model based mode based on co-located reconstructed luma samples and/or on neighboring reconstructed chroma samples.

For example, the first predictor is derived from a DIMD luma (as a Direct mode) or a DIMD chroma mode.

In one embodiment, the first and second non-LM mode are selected among a set of non-LM modes by minimization of a ratio-distortion trade-off.

For example, the set of non-LM modes comprises the planar prediction mode, the DC mode, the DM mode or a DIMD mode. A chroma predictor of the chroma block is derived based on each of the modes of this set. A rate/distortion cost function is then evaluated for each chroma predictor and the first non-LM mode corresponding to the best non-LM predictor i.e. that minimizes the ratio/distortion cost function (Rate/Distortion Optimization) is selected. Each non-LM mode may then be ordered based on the rate/distortion cost function and the second non-linear based model mode may be the second ordered non-NL model mode.

In a variant, the first non-linear-model based mode is a DIMD mode.

In a variant, the weights w1 and w2 of the first and second non-LM mode, respectively, equals 1/2.

In a variant, w1=3/4 and w2=1/4.

In a variant, the weights w1 and w2 are derived according to the presence in the top, left or top-left neighbours of the chroma block of samples predicted by either the first or the second predictors.

For instance, if the best (first) non-LM mode is the intra prediction mode of the top and left neighbours, weights are set as w0=¾ and w1=1/4. If the first non-LM mode is the intra prediction mode of the top or left neighbour, weights are set as w0=2/4 and w1=2/4. If the first non-LM mode is not the intra prediction mode of the top and left neighbour, weights are set as w0=1/4 and w1=3/4.

In a variant, the first and second non-LM modes correspond to the intra prediction modes with the two largest histogram amplitude values used for performing chroma prediction of the chroma block based on DIMD chroma mode.

In a variant, at most one of the first and second non-LM modes is a DIMD mode.

In a variant, in step 340, the final predictor of the chroma block is determined by blending the first and second predictors and a third predictor derived from a planar prediction, DC or DM mode where weights equal 1/3.

In a variant, chroma fusion is applied only if the best non-LM mode is different from a default mode selected as the second non-LM mode (comprising DC, DM, Planar . . . ).

In a variant, chroma fusion is applied only if the best non-LM mode is different from a default mode (comprising DC, DM, Planar . . . ). In a variant, weights wi (i=1, 2 or 3) are allocated according to presence in the top, left or top-left neighbours of the chroma block of samples predicted by either the first predictor, or the second predictor, or the third predictor.

A score is determined for each predictor in order to set chroma fusion weights. Initialized with 1, each score is incremented by 1 when a predictor is present. The denominator of each score is equal to the number of considered neighbours plus one.

In a variant, the first non-LM mode is a non-angular intra prediction mode (comprising DIMD chroma, Direct Mode, Planar, DC . . . ) and the second non-LM mode is an angular intra prediction mode.

In a variant, an angular intra prediction mode is either carried in the bitstream as an intra chroma mode or derived from co-located reconstructed luma samples (i.e. DM).

In a variant, if the second non-LM mode is identical to the first non-LM mode, then step 350 of method 300 is disabled.

In a variant, if the first non-LM based mode is planar or DC then step 350 of method 300 is disabled.

In a variant, if deriving a chroma predictor based on a LM mode is enabled, the LM mode is in competition (at the encoder) with the second non-LM mode i.e. the first non-LM mode is fused either with the second non-LM mode or the LM mode according to a rate/distortion optimisation.

In one embodiment of step 350, the data indicating whether deriving a chroma predictor based on a LM mode is enabled, is written/read into/from the bitstream by a syntax element chroma_fusion_mode_idc, where chroma_fusion_mode_idc is equal to 0 to indicate that blending the first and second predictors is disabled for a current CU/Coded Block(s), when chroma_fusion_mode_idc is equal to 1 to indicate the first non-linear-model predictor is blended with a predictor derived from a linear-model based mode, when chroma_fusion_mode_idc is equal to 2 to indicate the first predictor is blended with the second predictor when the first and second non-linear-model based predictors are different (for instance, the first predictor is the best non-LM mode and the second predictor is a default mode comprising DM, DC, planar modes . . . ).

The first non-LM mode may be signalled in the bitstream by conventional means (chroma intra prediction mode) or by implicit means (in case of DIMD chroma for instance where the DIMD chroma mode is indicated as enabled but the actual chroma intra prediction mode is derived at the decoder side).

In a variant, when chroma_fusion_mode_idc is equal to 1, the LM mode is blended with a default mode (comprising DM or DC or planar prediction mode).

In a variant, if deriving a chroma predictor based on a linear-model based mode is enabled in the video picture or a slice or a CTU or a CU of the video picture, the chroma blending is applied between the best non-LM mode and LM mode and if deriving a chroma predictor based on a linear-model based mode is disabled in a slice or a CTU or a CU of the video picture, the chroma blending/fusion is applied between the best non-LM mode and default mode.

Figure 11:
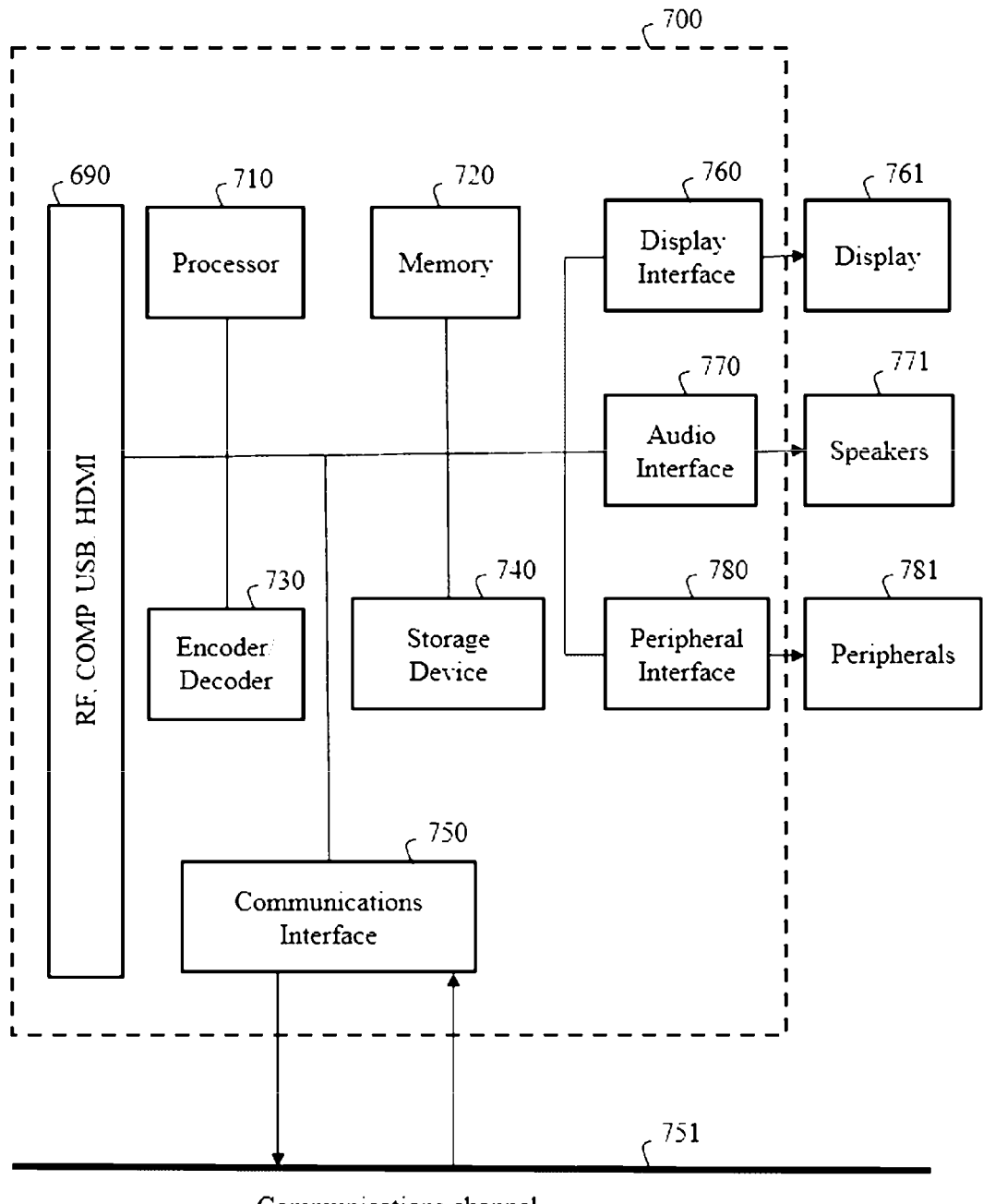
FIG. 11 illustrates a schematic block diagram of a system in which various aspects and embodiments are implemented.

FIG. 11 shows a schematic block diagram illustrating an example of a system 700 in which various aspects and embodiments are implemented.

System 700 may be embedded as one or more devices including the various components described below. In various embodiments, system 700 may be configured to implement one or more of the aspects described in the present disclosure.

Examples of equipment that may form all or part of the system 700 include personal computers, laptops, smartphones, tablet computers, digital multimedia set top boxes, digital television receivers, personal video recording systems, connected home appliances, connected vehicles and their associated processing systems, head mounted display devices (HMD, see-through glasses), projectors (beamers), "caves" (system including multiple displays), servers, video encoders, video decoders, post-processors processing output from a video decoder, pre-processors providing input to a video encoder, web servers, video servers (e.g. a broadcast server, a video-on-demand server or a web server), still or video camera, encoding or decoding chip or any other communication devices. Elements of system 700, singly or in combination, may be embodied in a single integrated circuit (IC), multiple ICs, and/or discrete components. For example, in at least one embodiment, the processing and encoder/decoder elements of system 700 may be distributed across multiple ICs and/or discrete components. In various embodiments, system 700 may be communicatively coupled to other similar systems, or to other electronic devices, via, for example, a communications bus or through dedicated input and/or output ports.

System 700 may include at least one processor 710 configured to execute instructions loaded therein for implementing, for example, the various aspects described in the present disclosure. Processor 710 may include embedded memory, input output interface, and various other circuitries as known in the art. System 700 may include at least one memory 720 (for example a volatile memory device and/or a non-volatile memory device). System 700 may include a storage device 740, which may include non-volatile memory and/or volatile memory, including, but not limited to, Electrically Erasable Programmable Read-Only Memory (EE-PROM), Read-Only Memory (ROM), Programmable Read-Only Memory (PROM), Random Access Memory (RAM), Dynamic Random-Access Memory (DRAM), Static Random-Access Memory (SRAM), flash, magnetic disk drive, and/or optical disk drive. The storage device 740 may include an internal storage device, an attached storage device, and/or a network accessible storage device, as non-limiting examples.

System 700 may include an encoder/decoder module 730 configured, for example, to process data to provide encoded/decoded video picture data, and the encoder/decoder module 730 may include its own processor and memory. The encoder/decoder module 730 may represent module(s) that may be included in a device to perform the encoding and/or decoding functions. As is known, a device may include one or both encoding and decoding modules. Additionally, encoder/decoder module 730 may be implemented as a separate element of system 700 or may be incorporated within processor 710 as a combination of hardware and software as known to those skilled in the art.

Program code to be loaded onto processor 710 or encoder/decoder module 730 to perform the various aspects described in the present disclosure may be stored in storage device 740 and subsequently loaded onto memory 720 for execution by processor 710. In accordance with various embodiments, one or more of processor 710, memory 720, storage device 740, and encoder/decoder module 730 may store one or more of various items during the performance of the processes described in the present disclosure. Such stored items may include, but are not limited to video picture data, information data used for encoding/decoding video picture data, a bitstream, matrices, variables, and intermediate or final results from the processing of equations, formulas, operations, and operational logic.

In several embodiments, memory inside of the processor 710 and/or the encoder/decoder module 730 may be used to store instructions and to provide working memory for processing that may be performed during encoding or decoding.

In other embodiments, however, a memory external to the processing device (for example, the processing device may be either the processor 710 or the encoder/decoder module 730) may be used for one or more of these functions. The external memory may be the memory 720 and/or the storage device 740, for example, a dynamic volatile memory and/or a non-volatile flash memory. In several embodiments, an external non-volatile flash memory may be used to store the operating system of a television. In at least one embodiment, a fast external dynamic volatile memory such as a RAM may be used as a working memory for video coding and decoding operations, such as for MPEG-2 part 2 (also known as ITU-T Recommendation H.262 and ISO/IEC 13818-2, also known as MPEG-2 Video), AVC, HEVC, EVC, VVC, AV1, etc.

The input to the elements of system 700 may be provided through various input devices as indicated in block 790. Such input devices include, but are not limited to, (i) an RF portion that may receive an RF signal transmitted, for example, over the air by a broadcaster, (ii) a Composite input terminal, (iii) a USB input terminal, (iv) an HDMI input terminal, (v) a bus such as CAN (Controller Area Network), CAN FD (Controller Area Network Flexible Data-Rate), FlexRay (ISO 17458) or Ethernet (ISO/IEC 802-3) bus when the present disclosure is implemented in the automotive domain.

In various embodiments, the input devices of block 790 may have associated respective input processing elements as known in the art. For example, the RF portion may be associated with elements necessary for (i) selecting a desired frequency (also referred to as selecting a signal, or band-limiting a signal to a band of frequencies), (ii) down-converting the selected signal, (iii) band-limiting again to a narrower band of frequencies to select (for example) a signal frequency band which may be referred to as a channel in certain embodiments, (iv) demodulating the down-converted and band-limited signal, (v) performing error correction, and (vi) demultiplexing to select the desired stream of data packets. The RF portion of various embodiments may include one or more elements to perform these functions, for example, frequency selectors, signal selectors, band-limiters, channel selectors, filters, downconverters, demodulators, error correctors, and de-multiplexers. The RF portion may include a tuner that performs various of these functions, including, for example, down-converting the received signal to a lower frequency (for example, an intermediate frequency or a near-baseband frequency) or to a baseband.

In one set-top box embodiment, the RF portion and its associated input processing element may receive an RF signal transmitted over a wired (for example, cable) medium. Then, the RF portion may perform frequency selection by filtering, down-converting, and filtering again to a desired frequency band.

Various embodiments rearrange the order of the above-described (and other) elements, remove some of these elements, and/or add other elements performing similar or different functions.

Adding elements may include inserting elements in between existing elements, such as, for example, inserting amplifiers and an analog-to-digital converter. In various embodiments, the RF portion may include an antenna.

Additionally, the USB and/or HDMI terminals may include respective interface processors for connecting system 700 to other electronic devices across USB and/or HDMI connections. It is to be understood that various aspects of input processing, for example, Reed-Solomon error correction, may be implemented, for example, within a separate input processing IC or within processor 710 as necessary. Similarly, aspects of USB or HDMI interface processing may be implemented within separate interface ICs or within processor 710 as necessary. The demodulated, error corrected, and demultiplexed stream may be provided to various processing elements, including, for example, processor 710, and encoder/decoder module 730 operating in combination with the memory and storage elements to process the data stream as necessary for presentation on an output device.

Various elements of system 700 may be provided within an integrated housing. Within the integrated housing, the various elements may be interconnected and transmit data therebetween using suitable connection arrangement 790, for example, an internal bus as known in the art, including the I2C bus, wiring, and printed circuit boards.

The system 700 may include a communication interface 750 that enables communication with other devices via communication channel 751. The communication interface 750 may include, but is not limited to, a transceiver configured to transmit and to receive data over communication channel 751. The communication interface 750 may include, but is not limited to, a modem or network card and the communication channel 751 may be implemented, for example, within a wired and/or a wireless medium.

Data may be streamed to system 700, in various embodiments, using a Wi-Fi network such as IEEE 802.11. The Wi-Fi signal of these embodiments may be received over the communications channel 751 and the communications interface 750 which are adapted for Wi-Fi communications. The communications channel 751 of these embodiments may be typically connected to an access point or router that provides access to outside networks including the Internet for allowing streaming applications and other over-the-top communications.

Other embodiments may provide streamed data to the system 700 using a set-top box that delivers the data over the HDMI connection of the input block 790.

Still other embodiments may provide streamed data to the system 700 using the RF connection of the input block 790.

The streamed data may be used as a way for signaling information used by the system 700. The signaling information may comprise the bitstream B and/or information such a number of pixels of 7a video picture and/or any coding/decoding setup parameters.

It is to be appreciated that signaling may be accomplished in a variety of ways. For example, one or more syntax elements, flags, and so forth may be used to signal information to a corresponding decoder in various embodiments.

System 700 may provide an output signal to various output devices, including a display 761, speakers 771, and other peripheral devices 781. The other peripheral devices 781 may include, in various examples of embodiments, one or more of a stand-alone DVR, a disk player, a stereo system, a lighting system, and other devices that provide a function based on the output of system 700.

In various embodiments, control signals may be communicated between the system 700 and the display 761, speakers 771, or other peripheral devices 781 using signaling such as AV.Link (Audio/Video Link), CEC (Consumer Electronics Control), or other communications protocols that enable device-to-device control with or without user intervention.

The output devices may be communicatively coupled to system 700 via dedicated connections through respective interfaces 760, 770, and 780.

Alternatively, the output devices may be connected to system 700 using the communications channel 751 via the communications interface 750. The display 761 and speakers 71 may be integrated in a single unit with the other components of system 700 in an electronic device such as, for example, a television.

In various embodiments, the display interface 760 may include a display driver, such as, for example, a timing controller (T Con) chip.

The display 761 and speaker 771 may alternatively be separate from one or more of the other components, for example, if the RF portion of input 790 is part of a separate set-top box. In various embodiments in which the display 761 and speakers 771 may be external components, the output signal may be provided via dedicated output connections, including, for example, HDMI ports, USB ports, or COMP outputs.

In FIGS. 1-11, various methods are described herein, and each of the methods includes one or more steps or actions for achieving the described method. Unless a specific order of steps or actions is required for proper operation of the method, the order and/or use of specific steps and/or actions may be modified or combined.

Some examples are described with regard to block diagrams and/or operational flowcharts. Each block represents a circuit element, module, or portion of code which includes one or more executable instructions for implementing the specified logical function(s). It should also be noted that in other implementations, the function(s) noted in the blocks may occur out of the indicated order. For example, two blocks shown in succession may, in fact, be executed substantially concurrently or the blocks may sometimes be executed in the reverse order, depending on the functionality involved.

The implementations and aspects described herein may be implemented in, for example, a method or a process, an apparatus, a computer program, a data stream, a bitstream, or a signal. Even if only discussed in the context of a single form of implementation (for example, discussed only as a method), the implementation of features discussed may also be implemented in other forms (for example, an apparatus or computer program).

The methods may be implemented in, for example, a processor, which refers to processing devices in general, including, for example, a computer, a microprocessor, an integrated circuit, or a programmable logic device. Processors also include communication devices.

Additionally, the methods may be implemented by instructions being performed by a processor, and such instructions (and/or data values produced by an implementation) may be stored on a computer-readable storage medium. A computer-readable storage medium may take the form of a computer-readable program product embodied in one or more computer-readable medium(s) and having computer-readable program code embodied thereon that is executable by a computer. A computer-readable storage medium as used herein may be considered a non-transitory storage medium given the inherent capability to store the information therein as well as the inherent capability to provide retrieval of the information therefrom. A computer-readable storage medium may be, for example, but is not limited to, an electronic, magnetic, optical, electromagnetic, infrared, or semiconductor system, apparatus, or device, or any suitable combination of the foregoing. It is to be appreciated that the following, while providing more specific examples of computer-readable storage mediums to which the present embodiments may be applied, is merely an illustrative and not an exhaustive listing as is readily appreciated by one of ordinary skill in the art: a portable computer diskette; a hard disk; a read-only memory (ROM); an erasable programmable read-only memory (EPROM or Flash memory); a portable compact disc read-only memory (CD-ROM); an optical storage device; a magnetic storage device; or any suitable combination of the foregoing.

The instructions may form an application program tangibly embodied on a processor-readable medium.

Instructions may be, for example, in hardware, firmware, software, or a combination. Instructions may be found in, for example, an operating system, a separate application, or a combination of the two. A processor may be characterized, therefore, as, for example, both a device configured to carry out a process and a device that includes a processor-readable medium (such as a storage device) having instructions for carrying out a process. Further, a processor-readable medium may store, in addition to or in lieu of instructions, data values produced by an implementation.

An apparatus may be implemented in, for example, appropriate hardware, software, and firmware. Examples of such apparatus include personal computers, laptops, smartphones, tablet computers, digital multimedia set top boxes, digital television receivers, personal video recording systems, connected home appliances, head mounted display devices (HMD, see-through glasses), projectors (beamers), "caves" (system including multiple displays), servers, video encoders, video decoders, post-processors processing output from a video decoder, pre-processors providing input to a video encoder, web servers, set-top boxes, and any other device for processing video pictures or other communication devices. As should be clear, the equipment may be mobile and even installed in a mobile vehicle.

Computer software may be implemented by the processor 710 or by hardware, or by a combination of hardware and software. As a non-limiting example, the embodiments may be also implemented by one or more integrated circuits. The memory 720 may be of any type appropriate to the technical environment and may be implemented using any appropriate data storage technology, such as optical memory devices, magnetic memory devices, semiconductor-based memory devices, fixed memory, and removable memory, as non-limiting examples. The processor 710 may be of any type appropriate to the technical environment, and may encompass one or more of microprocessors, general purpose computers, special purpose computers, and processors based on a multi-core architecture, as non-limiting examples.

As will be evident to one of ordinary skill in the art, implementations may produce a variety of signals formatted to carry information that may be, for example, stored or transmitted. The information may include, for example, instructions for performing a method, or data produced by one of the described implementations. For example, a signal may be formatted to carry the bitstream of a described embodiment. Such a signal may be formatted, for example, as an electromagnetic wave (for example, using a radio frequency portion of spectrum) or as a baseband signal. The formatting may include, for example, encoding a data stream and modulating a carrier with the encoded data stream. The information that the signal carries may be, for example, analog or digital information. The signal may be transmitted over a variety of different wired or wireless links, as is known. The signal may be stored on a processor-readable medium.

The terminology used herein is for the purpose of describing particular embodiments only and is not intended to be limiting. As used herein, the singular forms "a", "an", and "the" may be intended to include the plural forms as well, unless the context clearly indicates otherwise. It will be further understood that the terms "includes/comprises" and/or "including/comprising" when used in this specification, may specify the presence of stated, for example, features, integers, steps, operations, elements, and/or components but do not preclude the presence or addition of one or more other features, integers, steps, operations, elements, components, and/or groups thereof. Moreover, when an element is referred to as being "responsive" or "connected" or "associated with" to another element, it may be directly responsive or connected to or associated with the other element, or intervening elements may be present. In contrast, when an element is referred to as being "directly responsive" or "directly connected" to or "directly associated with" other elements, there are no intervening elements present.

It is to be appreciated that the use of any of the symbol/term "/", "and/or", and "at least one of", for example, in the cases of "A/B", "A and/or B" and "at least one of A and B", may be intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as is clear to one of ordinary skill in this and related arts, for as many items as are listed.

Various numeric values may be used in the present disclosure. The specific values may be for example purposes and the aspects described are not limited to these specific values.

It will be understood that, although the terms first, second, etc. may be used herein to describe various elements, these elements are not limited by these terms. These terms are only used to distinguish one element from another. For example, a first element could be termed a second element, and, similarly, a second element could be termed a first element without departing from the teachings of the present disclosure. No ordering is implied between a first element and a second element.

Reference to "one embodiment" or "an embodiment" or "one implementation" or "an implementation", as well as other variations thereof, is frequently used to convey that a particular feature, structure, characteristic, and so forth (described in connection with the embodiment/implementation) is included in at least one embodiment/implementation. Thus, the appearances of the phrase "in one embodiment" or "in an embodiment" or "in one implementation" or "in an implementation", as well any other variations, appearing in various places throughout the present disclosure are not necessarily all referring to the same embodiment.

Similarly, reference herein to "in accordance with an embodiment/example/implementation" or "in an embodiment/example/implementation", as well as other variations thereof, is frequently used to convey that a particular feature, structure, or characteristic (described in connection with the embodiment/example/implementation) may be included in at least one embodiment/example/implementation. Thus, the appearances of the expression "in accordance with an embodiment/example/implementation" or "in an embodiment/example/implementation" in various places in the present disclosure are not necessarily all referring to the same embodiment/example/implementation, nor are separate or alternative embodiment/examples/implementation necessarily mutually exclusive of other embodiments/examples/implementation.

Reference numerals appearing in the claims are by way of illustration only and shall have no limiting effect on the scope of the claims. Although not explicitly described, the present embodiments/examples and variants may be employed in any combination or sub-combination.

When a figure is presented as a flow diagram, it should be understood that it also provides a block diagram of a corresponding apparatus. Similarly, when a figure is presented as a block diagram, it should be understood that it also provides a flow diagram of a corresponding method/process.

Although some of the diagrams include arrows on communication paths to show a primary direction of communication, it is to be understood that communication may occur in the opposite direction to the depicted arrows.

Various implementations involve decoding. "Decoding", as used in this application, may encompass all or part of the processes performed, for example, on a received video picture (including possibly a received bitstream which encodes one or more video picture) in order to produce a final output suitable for display or for further processing in the reconstructed video domain. In various embodiments, such processes include one or more of the processes typically performed by a decoder. In various embodiments, such processes also, or alternatively, include processes performed by a decoder of various implementations described in the present disclosure, for example, As further examples, in one embodiment "decoding" may refer only to de-quantizing, in one embodiment "decoding" may refer to entropy decoding, in another embodiment "decoding" may refer only to differential decoding, and in another embodiment "decoding" may refer to combinations of de-quantizing, entropy decoding and differential decoding. Whether the phrase "decoding process" may be intended to refer specifically to a subset of operations or generally to the broader decoding process will be clear based on the context of the specific description and is believed to be well understood by those skilled in the art.

Various implementations involve encoding. In an analogous way to the above discussion about "decoding", "encoding" as used in the present disclosure may encompass all or part of the processes performed, for example, on an input video picture in order to produce an output bitstream. In various embodiments, such processes include one or more of the processes typically performed by an encoder. In various embodiments, such processes also, or alternatively, include processes performed by an encoder of various implementations described in this application.

As further examples, in one embodiment "encoding" may refer only to quantizing, in one embodiment "encoding" may refer only to entropy encoding, in another embodiment "encoding" may refer only to differential encoding, and in another embodiment "encoding" may refer to combinations of quantizing, differential encoding and entropy encoding. Whether the phrase "encoding process" may be intended to refer specifically to a subset of operations or generally to the broader encoding process will be clear based on the context of the specific descriptions and is believed to be well understood by those skilled in the art.

Additionally, the present disclosure may refer to "obtaining" various pieces of information. Obtaining the information may include one or more of, for example, estimating the information, calculating the information, predicting the information, or retrieving the information from memory, processing the information, moving the information, copying the information, erasing the information, calculating the information, determining the information, predicting the information, or estimating the information.

Additionally, this application may refer to "receiving" various pieces of information. Receiving the information may include one or more of, for example, accessing the information, or receiving information from a communication network.

Also, as used herein, the word "signal" refers to, among other things, indicating something to a corresponding decoder. For example, in certain embodiments, the encoder signals a particular information such as coding parameter or encoded video picture data. In this way, in an embodiment, the same parameter may be used at both the encoder side and the decoder side. Thus, for example, an encoder may transmit (explicit signaling) a particular parameter to the decoder so that the decoder may use the same particular parameter.

Conversely, if the decoder already has the particular parameter as well as others, then signaling may be used without transmitting (implicit signaling) to simply allow the decoder to know and select the particular parameter. By avoiding transmission of any actual functions, a bit savings is realized in various embodiments. It is to be appreciated that signaling may be accomplished in a variety of ways. For example, one or more syntax elements, flags, and so forth are used to signal information to a corresponding decoder in various embodiments. While the preceding relates to the verb form of the word "signal", the word "signal" may also be used herein as a noun.

A number of implementations have been described. Nevertheless, it will be understood that various modifications may be made. For example, elements of different implementations may be combined, supplemented, modified, or removed to produce other implementations. Additionally, one of ordinary skill will understand that other structures and processes may be substituted for those disclosed and the resulting implementations will perform at least substantially the same function(s), in at least substantially the same way(s), to achieve at least substantially the same result(s) as the implementations disclosed. Accordingly, these and other implementations are contemplated by this application.

The invention claimed is:

1. A method of intra predicting a chroma block of a video picture, comprising:

deriving a first predictor of the chroma block based on a first non-linear-model based mode;

in response to deriving a chroma predictor based on a linear-model based mode being disabled, deriving a second predictor of the chroma block based on a second non-linear-model based mode; and determining a final predictor of the chroma block by blending the first and second predictors, wherein the method further comprises:

encoding a video picture block into a bitstream of encoded video picture data, wherein the video picture block comprises predicting the chroma block of the video picture, wherein the method further comprises:

writing into the bitstream a data indicating whether deriving a chroma predictor based on a linear-model based mode is enabled, wherein the data indicating whether deriving the chroma predictor based on the linear-model based mode is enabled is written into the bitstream by a syntax element equal to 0 to indicate that blending the first and second predictors is disabled, equal to 1 to indicate the first predictor is blended with predictor derived from a linear-model based mode, equal to 2 to indicate the first predictor is blended with the second predictor when the first and second non-linear-model based predictors are different.

2. The method of claim 1, wherein the first and second non-linear-model based mode are selected among a set of non-linear-model based modes by minimization of a rate-distortion trade-off.

3. The method of claim 1, wherein the first predictor is derived from a first non-linear-model based mode based on at least one of co-located reconstructed luma samples or neighboring reconstructed chroma samples.

4. The method of claim 1, wherein the blending of the first and second predictors is a weighted combination between the first predictor and second predictor and weights of the weighted combination are derived according to presence in top, left or top-left neighbours of the chroma block of samples predicted by either the first predictor, or the second predictor.

5. The method of claim 1, wherein the first non-linear-model based mode is a non-angular intra prediction mode and the second non-linear-model based mode is an angular intra prediction mode.

6. A non-transitory computer-readable storage medium carrying instructions that, when being executed by a processor of an electronic device, cause the device to perform the method of claim 1.

7. An electronic device of intra predicting a chroma block of a video picture, comprising:
   a processor; and
   a memory for storing instructions executable by the processor;
   wherein the processor is configured to:
   derive a first predictor of the chroma block based on a first non-linear-model based mode;
   in response to deriving a chroma predictor based on a linear-model based mode being disabled, derive a second predictor of the chroma block based on a second non-linear-model based mode; and
   determine a final predictor of the chroma block by blending the first and second predictors,
   wherein the processor is further configured to:
   encode a video picture block into a bitstream of encoded video picture data, wherein the video picture block comprises predicting the chroma block of the video picture,
   wherein the processor is further configured to:
   write into the bitstream a data indicating whether deriving a chroma predictor based on a linear-model based mode is enabled,
   wherein the data indicating whether deriving the chroma predictor based on the linear-model based mode is enabled is written into the bitstream by a syntax element equal to 0 to indicate that blending the first and second predictors is disabled, equal to 1 to indicate the first predictor is blended with predictor derived from a linear-model based mode, equal to 2 to indicate the first predictor is blended with the second predictor when the first and second non-linear-model based predictors are different.

8. The device of claim 7, wherein the first and second non-linear-model based mode are selected among a set of non-linear-model based modes by minimization of a rate-distortion trade-off.

9. The device of claim 7, wherein the first predictor is derived from a first non-linear-model based mode based on at least one of co-located reconstructed luma samples or neighboring reconstructed chroma samples.

10. The device of claim 7, wherein the blending of the first and second predictors is a weighted combination between the first predictor and second predictor and weights of the weighted combination are derived according to presence in top, left or top-left neighbors of the chroma block of samples predicted by either the first predictor, or the second predictor.

11. The device of claim 7, wherein the first non-linear-model based mode is a non-angular intra prediction mode and the second non-linear-model based mode is an angular intra prediction mode.

12. A method of intra predicting a chroma block of a video picture, comprising:
   deriving a first predictor of the chroma block based on a first non-linear-model based mode;
   in response to deriving a chroma predictor based on a linear-model based mode being disabled, deriving a second predictor of the chroma block based on a second non-linear-model based mode; and
   determining a final predictor of the chroma block by blending the first and second predictors,
   wherein the method further comprises:
   decoding a video picture block from a bitstream of encoded video picture data, wherein the video picture block comprises predicting the chroma block of the video picture,
   wherein the method further comprises:
   reading from the bitstream a data indicating whether deriving a chroma predictor based on a linear-model based mode is enabled,
   wherein the data indicating whether deriving the chroma predictor based on the linear-model based mode is enabled is read from the bitstream by a syntax element equal to 0 to indicate that blending the first and second predictors is disabled, equal to 1 to indicate the first predictor is blended with predictor derived from a linear-model based mode, equal to 2 to indicate the first predictor is blended with the second predictor when the first and second non-linear-model based predictors are different.

13. The method of claim 12, wherein the first and second non-linear-model based mode are selected among a set of non-linear-model based modes by minimization of a rate-distortion trade-off.

14. The method of claim 12, wherein the first predictor is derived from a first non-linear-model based mode based on at least one of co-located reconstructed luma samples or neighboring reconstructed chroma samples.

15. The method of claim 12, wherein the blending of the first and second predictors is a weighted combination between the first predictor and second predictor and weights of the weighted combination are derived according to presence in top, left or top-left neighbors of the chroma block of samples predicted by either the first predictor, or the second predictor.

16. The method of claim 12, wherein the first non-linear-model based mode is a non-angular intra prediction mode and the second non-linear-model based mode is an angular intra prediction mode.

17. A non-transitory computer-readable storage medium carrying instructions that, when being executed by a processor of an electronic device, cause the device to perform the method of claim 12.

18. An electronic device of intra predicting a chroma block of a video picture, comprising:
   a processor; and
   a memory for storing instructions executable by the processor;
   wherein the processor is configured to perform the method of claim 12.

* * * * *